March 8, 1966  J. L. JEANNERET  3,238,630
APPARATUS FOR THE SPEEDY POSITIONING OF MULTIPLE TOOLS
ON THE TRANSVERSE CARRIAGE OF A LATHE
Filed March 18, 1964  3 Sheets-Sheet 1
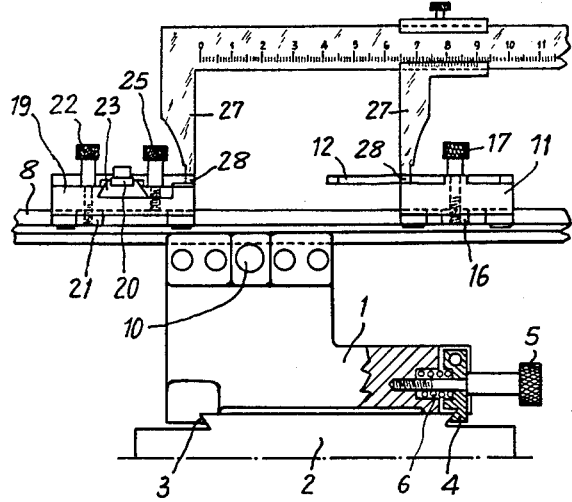
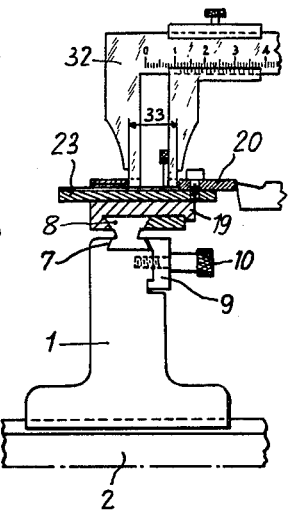
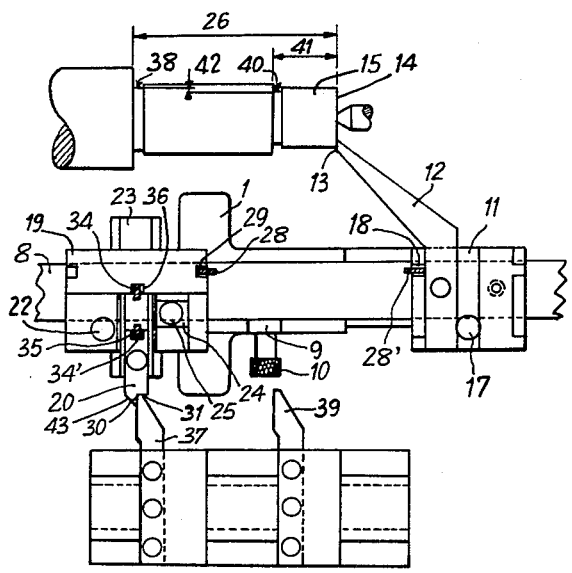
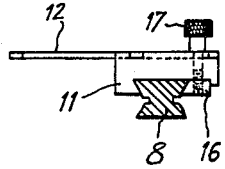
INVENTOR
JULES LOUIS JEANNERET
By Irwin S. Thompson
ATTY.

March 8, 1966  J. L. JEANNERET  3,238,630
APPARATUS FOR THE SPEEDY POSITIONING OF MULTIPLE TOOLS
ON THE TRANSVERSE CARRIAGE OF A LATHE
Filed March 18, 1964  3 Sheets-Sheet 2
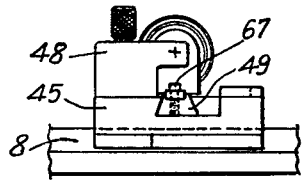
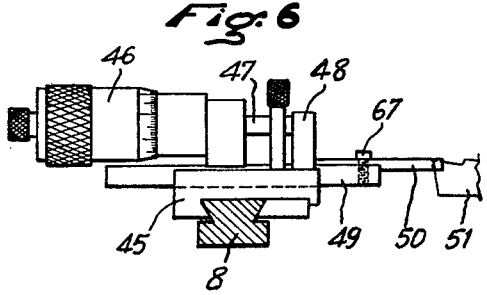
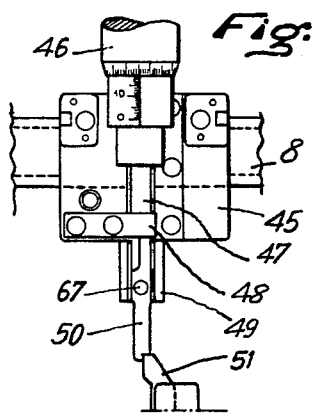
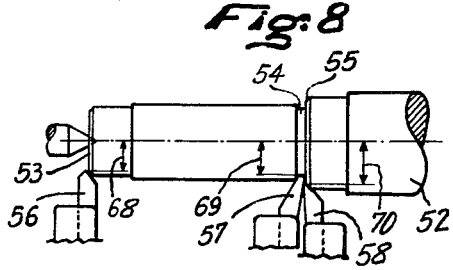
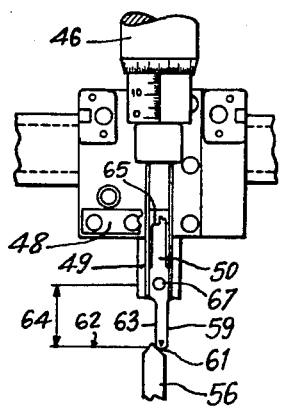
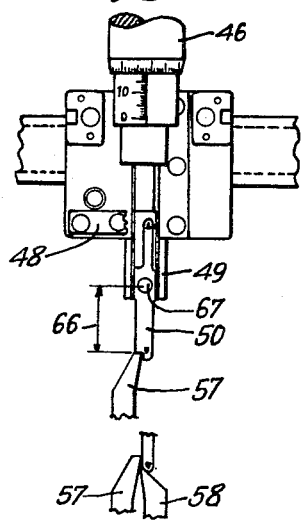
INVENTOR
JULES LOUIS JEANNERET
By Irwin & Thompson
ATTY.

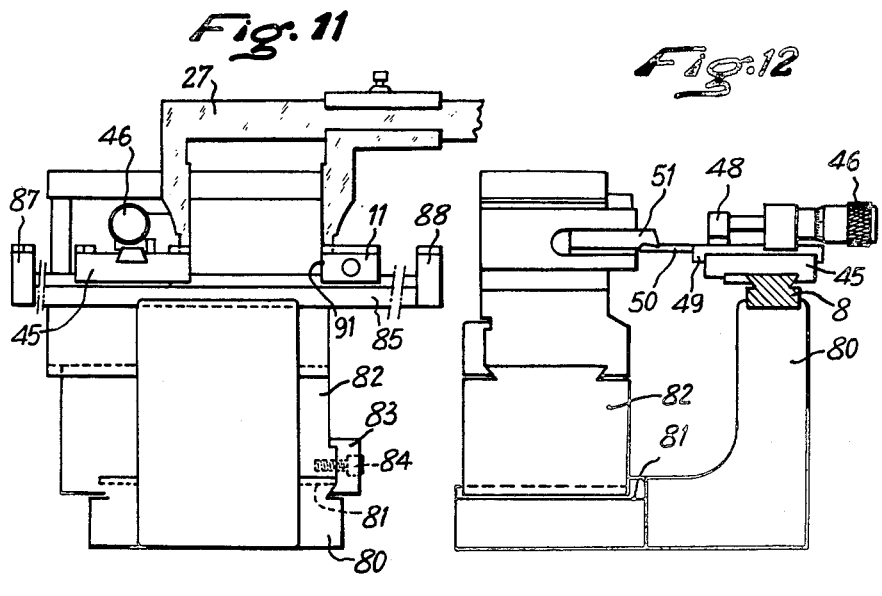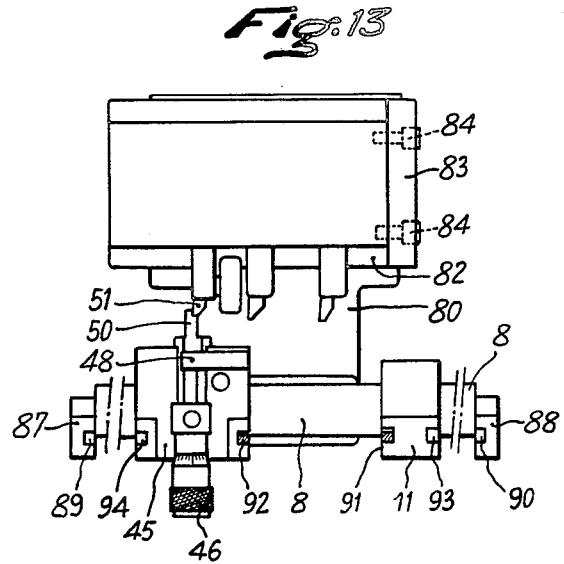

3,238,630
APPARATUS FOR THE SPEEDY POSITIONING OF MULTIPLE TOOLS ON THE TRANSVERSE CARRIAGE OF A LATHE
Jules Louis Jeanneret, 17 bis Ave. de Victor Hugo, Neuilly-sur-Seine, France
Filed Mar. 18, 1964, Ser. No. 352,890
Claims priority, application France, Mar. 26, 1963, 929,349
9 Claims. (Cl. 33—185)

My invention has for its object an apparatus which allows a speedy positioning of multiple tools on the transverse carriage of a lathe.

Said apparatus includes a track member sliding transversely and in parallelism with the axis of the work and carrying at adjustable points of its length, two sliders of which one is rigid with a feeler adapted to engage one end of the work while the other slider carries a shaped member the position of which is adjustable in a direction perpendicular to the rule whereby the end of the shaped member, defining the position to be given to any desired tool, may be accurately positioned both transversely and longitudinally with reference to the carriage of the lathe through a transfer of the desired dimension figures, for instance by means of slide calipers, onto the spacing between the two sliders and onto the spacing between the shaped member and the corresponding slider respectively.

The transfer of dimension figures defining the transverse position of the shaped member with reference to the slider carrying it may be executed by means of slide calipers of which the noses are brought to the desired spacing and are caused to engage notches formed respectively in the shaped member and in the slider corresponding thereto.

It is also possible to execute speedily and accurately this adjustment of the transverse position of the shaped member by resorting to a micrometer gauge carried on an auxiliary slidable bar inserted between the shaped member and the corresponding slider and of which the stop is brought, after the desired dimension figure has been transferred onto the micrometer gauge, into contact with a stop rigid with the slider carrying the shaped member through the agency of said slidable bar. Said very simple adjustment is repeated for each tool which it is desired to bring into position, through contact between said tool and the shaped member.

It is also possible to proceed with the longitudinal adjustment of the slider carrying the shaped member by ensuring the transfer of the longitudinal dimension figure by slide calipers of which the noses are caused to engage respectively a notch formed in one of the stops secured to the ends of the track member and a notch formed in said slider, said transfer of dimension figures being made, if required, with the aid of an origin-defining slider, of which the longitudinal position has been previously adjusted on the track member carrying the slider provided for the shaped member and which defines in its turn, the location of last-mentioned slider.

The accompanying drawings, given by way of example, illustrate three preferred embodiments of my invention. In said drawings:

FIG. 1 is an elevational view, partly sectional, of a first embodiment of the apparatus fitted on the transverse carriage of a lathe seen endwise, FIG. 2 is a partly sectional view thereof in a direction perpendicular to FIG. 1, FIG. 3 is a view from above of the system constituted by the apparatus, the tool-holder and the work, FIG. 4 is a partial cross-section through line IV—IV of FIG. 1 in a plane parallel with the plane of FIG. 2, illustrating the location of the feeler with reference with the track member carrying it, FIGS. 5 and 6 illustrate in endwise and elevational views, the system including the track member carrying the sliders together with the slider carrying the shaped member and the transverse adjusting means, in accordance with a second embodiment, FIG. 7 is a view from above of the same system, FIG. 8 illustrates the work to be machined on last-mentioned system, FIGS. 9 and 10 correspond to FIG. 7 for different positions of the shaped member, FIGS. 11 to 13 are lateral, endwise and plan views of the apparatus according to a third embodiment.

The apparatus illustrated in FIGS. 1 to 4 includes a body 1 adapted to slide over the slideway 3 of the lathe carriage 2 and to be locked thereon by a clamp 4 subjected to the action of the screw 5 provided with a knurled head. A spring 6 is provided for urging the clamp 4 away from the body 1 when the screw 5 is released so as to further the removal and the positioning of the apparatus on the carriage 2.

The upper surface of the body 1 of the apparatus shows a transverse slideway 7 inside which may slide the track member 8 which may be secured in a longitudinally adjustable position by the clamp 9 locked on the track member 8 by the screw 10 provided with a knurled head.

The track member 8 carries at adjustable points of its length two sliders 11 and 19. The slider 11 is rigid with the feeler 12 of which the terminal stop 13 is brought into contact with the end 14 of the work 15 (FIG. 3). Said slider 11 may be locked in position on the track member 8 through the clamp 16 and the screw 17 (FIG. 4).

The second slider 19 may be rigidly secured to the track member 8 in a longitudinally adjusted position by the clamp 21 and a screw 22 provided with a knurled head; said slider 19 carries through the agency of a slidable bar 23, which slides transversely with reference to the track member 8, a shaped member 20. Said bar 23 is locked onto the slider 19 after adjustment by a clamp 24 and the screw 25 provided with a knurled head.

The shaped member 20 is provided with two straight terminal surfaces and the end of the lateral surface 43 of said shaped member has an outline corresponding to that of the tool which is to form a bevel, groove or the like shaped section to be machined as required. This shaped member allows through its longitudinal and transverse adjustments, bringing tools such as 37 and 39 into the desired position as defined by the engagement of said tools with the shaped member.

The preliminary adjustment consists first in positioning the saddle or transverse carriage of the lathe carrying the transverse slideway 2 by setting it against an abutment defining its longitudinal position, after which the stop 13 on the feeler 12 is brought into contact with the end of the work and the slider 11 rigid with the feeler is locked on the track member 8 by means of the clamp 16 held fast by the screw 17 provided with a knurled head.

In order to ensure subsequently the transfer of the dimension figures of the outlines to be obtained, it is of advantage to resort to calipers 27. Said calipers are first adjusted in accordance with the dimension 26 defining the distance between the end 14 of the work carried by the lathe and the surface to be machined, to wit, in the case considered, the groove 38. This being done, the noses 28 and 28' of the calipers 27 are introduced into the corresponding notches provided respectively at 18 and 29 in the sliders 11 and 19.

The positioning of said noses defines accurately the spacing between the sliders and consequently the position of the shaped member 20 and more precisely that of its longitudinally extending surface section 30 longitudinally of the track member 8.

The positioning in a transverse direction of the shaped member and more precisely of its transverse surface section 31 is performed similarly by setting on the calipers, illustrated at 32 in FIG. 2 and which may be the same as the calipers 27, the dimension 33 (FIG. 2) corresponding to the minimum overhanging of the tools to be used, after which the noses 34 and 34' of said calipers 32 are caused to engage the notches 35 and 36 provided respectively in the shaped member 20 and in the corresponding slider 19.

The shaped member 20 thus adjusted both longitudinally and transversely allows positioning accurately the tool 37, as illustrated, so that said tool may produce the groove 38 when machining the work.

As to the tool 39, the procedure is the same and the dimension 26 is replaced in the calipers 27 by the dimension 41 corresponding to the groove 40 to be executed by said tool 39 so as to ensure the accurate positioning of the shaped member 20 in a longtiudinal direction.

Similarly, the transverse position of the shaped member 20 is obtained in such a case by subtracting from the dimension 33 serving for the cutting of the groove 38 the difference 42 between the radial locations of the grooves 38 and 40.

In FIGS. 5 to 10, the track member 8 which is supposed to be secured transversely on the slider of a lathe in an adjustable position carries, in addition to the feeler-carrying slider which is not illustrated and which is advantageously similar to that illustrated in the preceding case, a slider 45 the longitudinal adjustment of which on the track member 8 is also performed by means of slide calipers. Over said slider 45 may slide transversely a slidable bar 49 carrying the shaped member 50 adapted to adjust the location of the tool 51, said shaped member being adapted to pivot with reference to the slidable bar 49 by 180° round the pivot-forming screw 67. When adjusting the position of the shaped member, I resort to a micrometer-gauge 46 secured to the bar 49 and to which the desired dimension is transferred while the stop 47 on the micrometer-gauge thus adjusted is caused to engage the stop 48 rigid with the slider 45. This brings the end of the shaped member into a position in which it ensures through its abutment with the tool the correct positioning of the latter.

If the capacity of the micrometer-gauge as to diametrical measurements is not sufficient, the diameters are measured starting from the smallest diameter to be obtained on the lathe and to which the zero of the micrometer-gauge scale is caused to correspond.

FIG. 8 illustrates by way of example a work 52 machined by means of a suitable traversing system. Said work is provided with a terminal bevel 53, with a groove 54 and with a further bevel 55 obtained respectively by the tools 56, 57 and 58.

With a view to obtaining the desired adjustments, I give advantageously the shaped member the outline illustrated, including at its end 59 a bevel 61 starting from a point 62 of a recessed surface area 63 extending along the axis of the shaped member the opposite end of which shows a square-shaped notch 65. The spacing 64 between the point 62 of the shaped member and the pivot-forming screw 67 is equal to the spacing 66 between the latter and the stop formed by the notch 65.

The shape thus given to the shaped member and the possibility of using it in two positions at 180° from each other and even after turning it round, allows obtaining the adjustment of each of the tools 56, 57, 58, as shown in FIGS. 9 and 10.

In the case of FIG. 9, the micrometer-gauge is set in conformity with the desired adjustment of the tool 56 to show an indication equal to the radial spacing 68 between the axis of the work and the smaller base of the bevel 53 to be formed at the end of the work (FIG. 8). After positioning the shaped member in the manner illustrated in FIG. 9, it is sufficient to urge it back with its slidable bar 49 into contact with the stop 47 on the micrometer-gauge so as to define the position to be given to the tool 56 when in contacting relationship with the shaped member.

The procedure is the same for the positioning of the tools 57 and 58 in accordance with the radii 69 of the groove 54 and 70 of the bevel 35. Obviously, the shaped member is turned round for the positioning of the tool 57.

The support 80 of the apparatus illustrated in FIGS. 11 to 13, shows a dove-tailed guide 51 matching exactly the dove-tailed guide formed on the transverse carriage or saddle of the lathe which is to carry the tool-holder to be adjusted.

The shoe 82 carrying the tools such as 51 slides over the support 80 along the guiding means 81 and is secured to said support 80 under the same conditions exactly as those governing its subsequent securing on the transverse carriage of the lathe, that is, as illustrated, it is held fast by the clamp 83 and the screws 84. The track member 8 is secured permanently to the support 80 and carries, as in the case of FIGS. 5 to 10, a slider 45 carrying in its turn through the agency of a slidable rod 49 the shaped member 50. The transverse adjustment of the shaped member is performed as described in the case of FIGS. 5 to 10 by means of a micrometer gauge rigid with the slidable rod 49 while its end, once adjusted, is adapted to engage the stop 48 rigid with the slider 45.

It is possible to position on the other hand and as desired, the origin-defining slider 11 either on the right-hand side of the slider 45 as illustrated in FIGS. 11 and 13, or else on the left-hand side. Its positioning is selected in accordance with the position of the work. To each end of the track member 8 is secured for this purpose a stop, respectively 87 or 88, provided with a notch, respectively 89 or 90, facing the slider 45 carried by said track member. These notches serve for adjusting the position of the origin-defining slider by transferring a measurement corresponding to the position of the work by means of calipers of which the noses are brought into engagement respectively with the notch 89 or 90 on one of the stops and with the cooperating notch 91 or 93 provided in the origin-defining slider 11 according as to whether the latter is located on the right-hand side or on the left-hand side of the slider 45 carrying the slidable bar 49. It is possible as well to proceed as in the case of FIGS. 1 to 4, by bringing into contact with the end of the work, a feeler rigid with the origin-defining slider 11.

In the case illustrated, the surface of the origin-defining slider provided with the notch 91, is thus positioned accurately in conformity with the position of the end of the work. This being done, the adjustment of the longitudinal position of the slider 45 is proceeded with and consequently thus the longitudinal adjustment described with reference to FIGS. 1 to 4. In other words, the calipers 27 are set in position by spacing its noses by an amount equal to the spacing between the end of the work and the cross-section to be machined on the latter, and introducing said noses respectively in the notch 91 of the origin-defining slider 11 which has been accurately positioned and in the corresponding notch 92 of the slider 45 carrying the auxiliary rule. Of course, if the origin-defining slider 11 was positioned on the left-hand side of the slider 45, the noses of the calipers would be positioned in the other notches 93 and 94 of the sliders 11 and 45 respectively.

The adjustment of the slidable rod 49 in the transverse direction is executed by means of the micrometer gauge 46 as described with reference to FIGS. 5 to 10, although I may proceed also otherwise by resorting to the calipers as in the case of FIGS. 1 to 4.

The longitudinal positioning of the slider 45 may also be ensured, without resorting to the origin-defining slider 11, by positioning directly the caliper noses inside a notch such as 90 in stop 88 on the track member 8 and the corresponding notch such as 92 in the slider 45. This is interesting in the case of a machining in mass production of identical parts. The longitudinal dimension figures of the tools should be noted of course in this case so as to allow the repetition of the adjustment when returning to the machining of parts of different types.

Obviously, various modifications may be brought to the apparatus which has just been described without at all widening the scope of the invention, which consists in applying to a shaped positioning member, the dimension figures measured on the part to be machined. In particular, said mechanism may be fitted not only over a transverse carriage of a lathe, but also over the carrier of a front tool, over a preliminary adjusting support, etc.

What I claim is:

1. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work piece, a shaped member carried by the other slider and adapted to be adjustably secured thereto at a predetermined distance from the axis of the track member to set the end of the shaped member, upon shifting of the other slider and adjustment of the shaped member, in a position defining the desired transverse and longitudinal location of a tool with reference to the lathe carriage and means for measuring and transferring dimension figures to the spacing between the sliders and to the spacing of the shaped member with reference to said other slider.

2. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, a feeler rigid with the first slider and the end of which is adapted to engage the end of the work, a shaped member carried by the other slider and adapted to be adjustably secured thereto at a predetermined distance from the axis of the track member to set the end of the shaped member, upon shifting of the other slider and adjustment of the shaped member, in a position defining the desired transverse and longitudinal location of a tool with reference to the lathe carriage and means for measuring and transferring dimension figures to the spacing between the sliders and to the spacing of the shaped member with reference to said other slider.

3. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work-piece, a projection rigid with the other slider, a bar slidingly carried by the other slider, a micrometer gauge carried by said bar and adapted to engage, after adjustment of the micrometer gauge to a predetermined dimension figure, said projection on said other slider, to define the position of said bar transversely of the track member and a shaped member rigid with the slidable bar, the operative end of said shaped member lying upon shifting of the other slider and operation of the micrometer gauge, in a position defining the desired transverse and longitudinal location of a tool with reference to the lathe carriage.

4. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work-piece, a projection rigid with the other slider, a bar slidingly carried by the other slider, a micrometer gauge carried by said bar and adapted to engage, after adjustment of the micrometer gauge to a predetermined dimension figure, said projection on said other slider, to define the position of said bar transversely of the track member and a shaped member pivotally secured to said slidable bar for selected use of both ends of the shaped member, the operative end of said shaped member lying, upon shifting of the other slider and operation of the micrometer gauge, in a position defining the desired transverse and longitudinal location of a tool with reference to the lathe carriage.

5. An apparatus for the speedy positioning of multiple tools on the transverse carriage of a lathe adapted to machine a rotary work-piece, said appartus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work-piece, a projection rigid with the other slider, a bar slidingly carried by the other slider, a micrometer gauge carried by said bar and adapted to engage, after adjustment of the micrometer gauge to a predetermined dimension figure, said projection on said other slider, to define the position of said bar transversely of the track member, said micrometer gauge being gauged in values of spacings between the axis of the work and the point at which the machining is to be executed by the tool, and a shaped member pivotally secured to said slidable bar for selected use of both ends of the shaped member, the operative end of said shaped member lying upon shifting of the other slider and operation of the micrometer gauge, in a position defining the desired transverse and longitudinal location of a tool with reference to the lathe carriage.

6. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, two stops rigid with the ends of the track member, cooperating notches being provided on the first slider and on each of the steps, calipers adapted to engage through their noses cooperating notches on the first slider and on one of the steps to define the longitudinal position of the first slider with reference to the location of the end of the work-piece, a shaped member carried by the other slider and adapted to be adjustably secured thereto at a predetermined distance from the axis of the track member to set the end of the shaped member, upon adjustment of the other slider and adjustment of the shaped member, in a position defining the desired transverse and longitudinal location of a tool with reference to the lathe carriage.

7. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, two stops rigid with the ends of the track member, cooperating notches being provided on the first slider and on each of the steps, calipers adapted to engage through their noses cooperating notches on the first slider and on one of the steps to define the longitudinal position of the first slider with reference to the location of the end of the work-piece, a shaped member carried by the other slider and adapted to be adjustably secured thereto, further cooperating notches being provided on the two sliders to be engaged by the caliper noses and thereby to ensure the desired spacing of the sliders and still further cooperating notches being provided on the said other slider and on the shaped member to be engaged by the caliper noses and thereby to ensure the desired spacing between said shaped member and the rule, the end of the shaped member defining the desired transverse and longitudinal location of a tool.

8. An apparatus for the speedy positioning of multiple tools on the transverse carriage of a lathe adapted to machine a rotary work-piece, said apparatus comprising a body adapted to be secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work-piece, a projection rigid with the other slider, a bar slidingly carried by the other slider, a micrometer gauge carried by said bar and adapted to engage, after adjustment of the micrometer gauge to a predetermined dimension figure, said projection on said other slider, to define the position of said bar transversely of the track member and a shaped member rigid with the slidable bar, two stops rigid with the ends of the track member, cooperating notches being provided on the first slider and on each of the stops, calipers adapted to engage through their noses cooperating notches on the first slider and on one of the stops to define the longitudinal position of the first slider, further cooperating notches being provided on the two sliders to be engaged by the caliper noses and thereby to ensure the desired spacing of the sliders, the operative end of the shaped member defining after operation of the calipers the location of a tool.

9. An apparatus for the speedy positioning of multiple tools on the transverse carriage of a lathe adapted to machine a rotary work-piece, said carriage being provided with a dove-tailed guideway, said apparatus comprising a body adapted to be slidingly secured to said carriage, a track member adapted to slide transversely over said body in a direction parallel with the axis of the work-piece to be machined, two sliders slidable longitudinally over the track member, means securing said sliders at adjustable points of their path over the track member, the first slider defining the location of the end of the work-piece, a shaped member carried by the other slider and adapted to be adjustably secured thereto at a predetermined distance from the axis of the track member to set the end of the shaped member, upon shifting of the other slider and adjustment of the shaped member, in a position defining the desired transverse and longitudinal location of a tool with reference to the lathe carriage and means for measuring and transferring dimension figures to the spacing between the sliders and to the spacing of the shaped member with reference to said other slider.

References Cited by the Examiner

UNITED STATES PATENTS

| | | |
|---|---|---|
| 493,807 | 3/1893 | Beale. |
| 630,316 | 8/1899 | Beach _____ 33—185 |
| 1,404,545 | 1/1922 | Richardson. |
| 1,849,305 | 3/1932 | Magarian. |
| 2,059,740 | 3/1935 | Minchew _____ 33—185 X |
| 2,105,703 | 7/1937 | Self _____ 33—125 |
| 2,107,558 | 2/1938 | Zimmerman _____ 33—185 |
| 2,455,076 | 11/1948 | Magealson _____ 33—185 X |
| 2,658,283 | 11/1953 | Ciccone _____ 33—185 |
| 3,067,521 | 12/1962 | Platt _____ 33—185 |

FOREIGN PATENTS 17,665  8/1908  Great Britain.

ISAAC LISANN, *Primary Examiner.*